(12) United States Patent
Laine

(10) Patent No.: US 8,733,079 B2
(45) Date of Patent: May 27, 2014

(54) ELECTRIC THRUSTER FOR A SPACECRAFT

(75) Inventor: Robert André Laine, Paris (FR)

(73) Assignee: Astrium SAS, Paris (FR)

( * ) Notice: Subject to any disclaimer, the term of this patent is extended or adjusted under 35 U.S.C. 154(b) by 859 days.

(21) Appl. No.: 12/992,000

(22) PCT Filed: May 11, 2009

(86) PCT No.: PCT/FR2009/000543
§ 371 (c)(1),
(2), (4) Date: Nov. 10, 2010

(87) PCT Pub. No.: WO2009/150312
PCT Pub. Date: Dec. 17, 2009

(65) Prior Publication Data
US 2011/0067380 A1    Mar. 24, 2011

(30) Foreign Application Priority Data
May 19, 2008    (FR) ...................................... 08 02688

(51) Int. Cl.
*F03H 1/00* (2006.01)
*H05H 1/00* (2006.01)
*F02K 9/66* (2006.01)

(52) U.S. Cl.
USPC .............................. 60/202; 60/201; 60/203.1

(58) Field of Classification Search
USPC ........................................ 60/201, 202, 203.1
See application file for complete search history.

(56) References Cited

U.S. PATENT DOCUMENTS

| 5,738,308 A | 4/1998 | Haag |
| 6,109,663 A | 8/2000 | Hayton |
| 6,279,314 B1 | 8/2001 | Valentian et al. |
| 7,530,219 B1 * | 5/2009 | Burton et al. ................. 60/203.1 |
| 7,926,257 B1 * | 4/2011 | Burton et al. ................... 60/202 |
| 2008/0271430 A1 | 11/2008 | Chabert |

FOREIGN PATENT DOCUMENTS

JP    2005036717 A    2/2005

OTHER PUBLICATIONS

Kural, A. et al. (2004) "Design of an ion thruster movable grid thrust vectoring system," Acta Astronautica, 55:421-432.
Written Opinion of the International Searching Authority, opinion completed Oct. 15, 2009 by the European Patent Office, for International Application No. PCT/FR2009/000543.

* cited by examiner

*Primary Examiner* — William H Rodriguez
*Assistant Examiner* — Arun Goyal
(74) *Attorney, Agent, or Firm* — Novak Druce Connolly Bove + Quigg LLP

(57) ABSTRACT

The invention relates to an electric thruster for a spacecraft. According to the invention, the thruster (II) comprises a jet generating portion (G1) and a jet accelerating portion (A2), pivotably connected (H1) such that the jet accelerating portion (A2) can rotate in relation to the jet generating portion (G1).

9 Claims, 3 Drawing Sheets

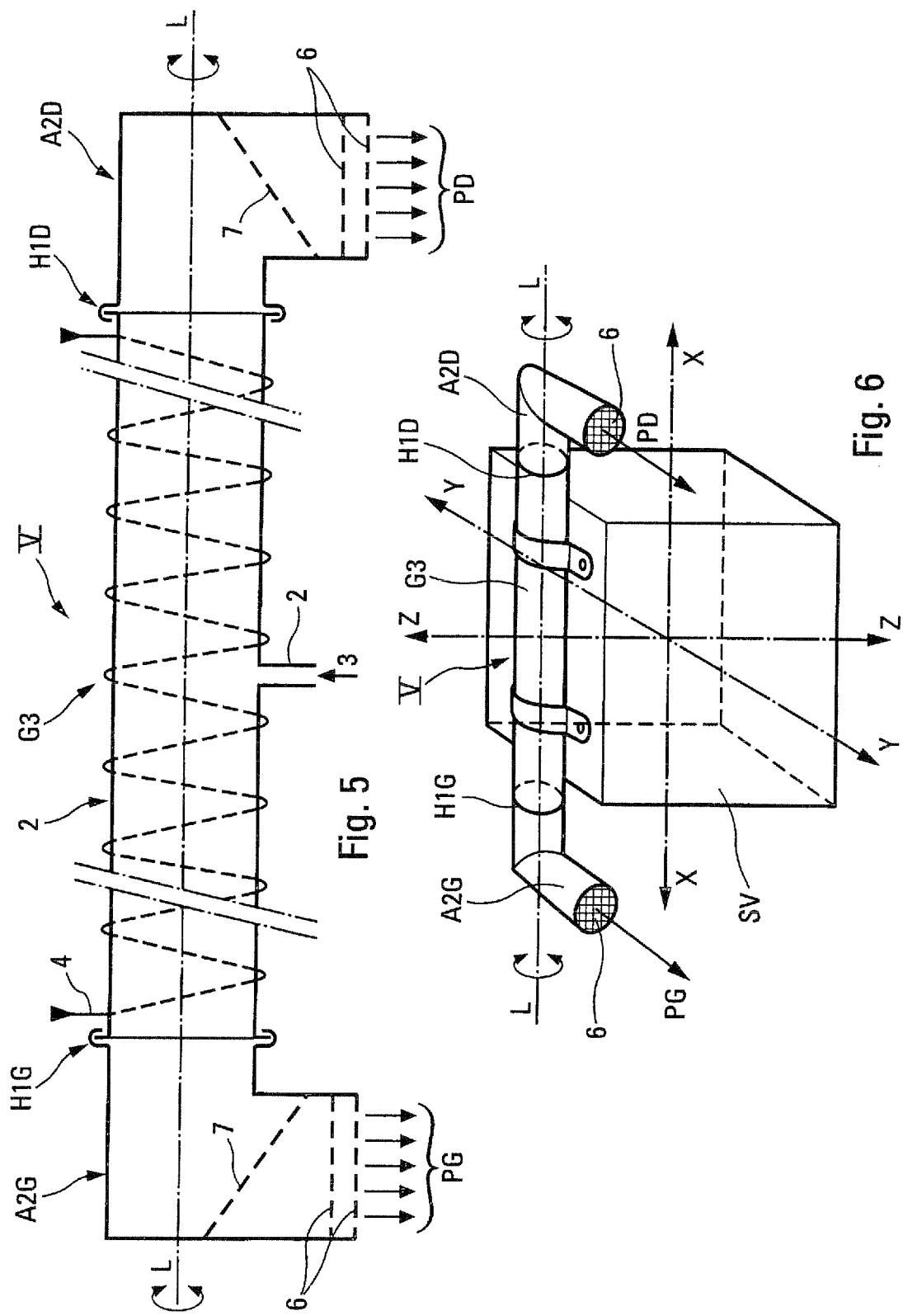

ELECTRIC THRUSTER FOR A SPACECRAFT

CROSS-REFERENCE TO RELATED APPLICATIONS

This application is a §371 national stage entry of International Application No. PCT/FR2009/000543, filed May 11, 2009, which claims priority to French Patent Application 08/02688, filed May 19, 2008, the entire contents of which are incorporated herein by reference.

FIELD OF THE INVENTION

The present invention relates to an ionic or plasmic jet space electric thruster, as well as to a spacecraft provided with at least such a thruster.

BACKGROUND OF THE INVENTION

It is known that ionic or plasmic type space electric thrusters, which have been used for long for thrusting spacecrafts, have the advantage of a high specific impulse allowing a same speed increment to be obtained for a lower ergol mass than a chemical thruster. On the other hand, the dry mass of an ionic or plasmic jet electric thruster is generally higher than that of a chemical thruster. Now, for a determined ergol mass, any increase of the dry mass results in a reduction of the speed increment.

One of the causes of the importance of the dry mass of such a space electric thruster is due to the need to orient the direction of the thrust thereof. Indeed, a space electric thruster being bulky and expensive, it is not economical to arrange several of them in order to allow a pulsed operation to be implemented, so as to simultaneously provide the thrust and the directional steering.

In order to overcome such a drawback, it has been contemplated arranging such a jet electric thruster on an orientable platform. However, such a platform should bear the whole thruster and the connections with the supply system for ergol being used as a fuel for generating the jet from said thruster. This leads to a significant increase of the dry mass of the thrusting system, while the thrust orientation freedom remains limited to about 30 degrees, which is not always sufficient for all the phases of a space mission.

Furthermore, it has also been contemplated to deflect the jet of a space thruster through modifying the electric or magnetic field at the outlet thereof. However, only a few degrees of orientation freedom for the thrust direction can be achieved.

SUMMARY OF THE INVENTION

The present invention aims at overcoming the drawbacks of the above mentioned prior art minimizing the dry mass of the electric thruster and obtaining a good orientation ability for the orientation of the thrust thereof.

To this end, according to the invention, the ionic or plasmic jet space electric thruster for a spacecraft, comprising a tubular shell provided with means for generating said jet and with means for accelerating said jet, is remarkable in that:
  it comprises a tubular part provided with generation means and at least one tubular part provided with acceleration means;
  said tubular parts are arranged one after the other; and
  the ends opposite said tubular parts are connected together by a joint allowing the part provided with acceleration means to rotate with respect to said part provided with generation means.

Thus, according to the present invention, the primary function of plasma generation is disconnected from the acceleration function thereof, generating the thrust of said thruster. Thanks to such a disconnection of the jet generation and acceleration functions, the primary plasma generating part can be fastened to the structure of the spacecraft, only the accelerating part being orientable. Thus, a spacecraft according to the present invention is remarkable in that it comprises at least one thruster of this invention and in that said tubular part provided with generation means is made integral with said spacecraft.

It can be seen that such a configuration for the space electric thruster of the present invention minimizes the mass of the moving parts, and thereby of the driving mechanism thereof, while providing a larger clearance angle of the thrust direction. The fact that the jet generating part, requiring low voltage electric power and thus high section wires as well as gas supply manifolds, is directly arranged on the structure of the spacecraft further enables to gain mass with respect to any solution where the whole engine is arranged on a mobile platform.

In an advantageous embodiment, said thruster comprises a central tubular part provided with generation means and two side tubular parts provided with acceleration means, said side tubular parts being arranged on both sides of said central part and being jointed rotationally with respect to the latter Thus, with such a configuration, it can be exerted on said spacecraft, as will be hereinafter seen, not only rectilinear shifting forces, but also torques.

The axis of said rotation joint between said tubular part provided with generation means and a tubular part provided with acceleration means could be merged with the axis of said tubular part provided with generation means or even tilted with respect to the latter.

Furthermore, the tubular part(s) provided with acceleration means could be rectilinear or, on the contrary, have the shape of a bend. In the first case, the jet outlet side of said rectilinear tubular part is tilted with respect to said axis of the rotation joint. In the second case, said bend could form a right angle.

Moreover, such a tubular part provided with acceleration means and having the shape of a bend could comprise an additional intermediary joint allowing one of its branches to rotate with respect to the other.

BRIEF DESCRIPTION OF THE DRAWINGS

The figures of the appended drawing will better explain how this invention can be implemented. In these figures, like reference numerals relate to like components FIGS. 1 to 5 schematically illustrate five embodiments of a jet space electric thruster according to the present invention. On these figures, for clarity purposes, there is no representation of the driving means used to rotate the tubular acceleration part(s) with respect to the tubular generation part. It is however easy to understand that such driving means could comprise, for example, a coaxial integral gear for each tubular acceleration part and a pinion gearing with said gear and rotationally driven by an engine, for example, an electric engine.

FIG. 6 schematically shows how to arrange the electric thruster of FIG. 5 on a spacecraft.

DETAILED DESCRIPTION

Figure 1:
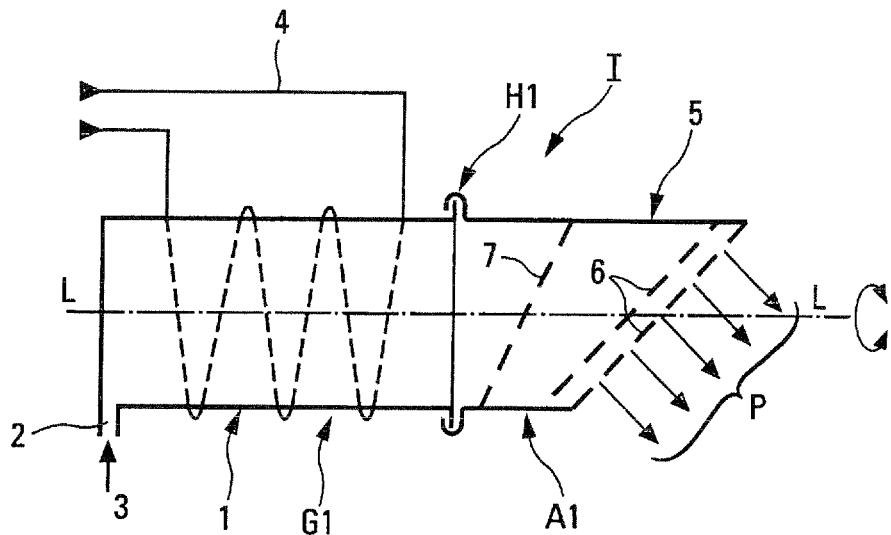

The plasmic jet space electric thruster I, according to the present invention and shown on FIG. 1, comprises a tubular generation part G1, with an axis L-L, adapted to be fastened on a spacecraft (not shown), and a tubular acceleration part A1, also with an axis L-L, being rectilinear and arranged in continuation of said tubular generation part G1. The ends being opposite said tubular parts G1 and A1 are connected to each other by a rotation joint H1, the rotation axis is merged with the axis L-L of the tubular generation part G1. Thus, the rectilinear tubular acceleration part A1 is able to rotate on itself around said axis L-L.

The tubular generation part G1 comprises a tubular shell 1 provided with an input 2 for a gas 3, as well as a heating antenna 4 for the plasma generated by said gas.

The tubular acceleration part A1 comprises a tubular shell 5 having the plasmic jet outlet side P, opposite the rotation joint H1, being oblique with respect to the axis L-L and plugged by acceleration grids 6. In order to improve a uniform extraction of the plasma ions, one or more additional acceleration grids 7 can be arranged between the joint H1 and the acceleration grids 6.

It is easy to understand that, when the generation part G1 is made integral with a spacecraft (not shown) and the acceleration part A1 rotates around the axis L-L, the plasmic jet P follows a cone around said axis, so that the direction of the thrust it exerts on said spacecraft also rotates around the axis L-L. Steering said spacecraft thus occurs by a simple rotation around the axis L-L.

Figure 2:
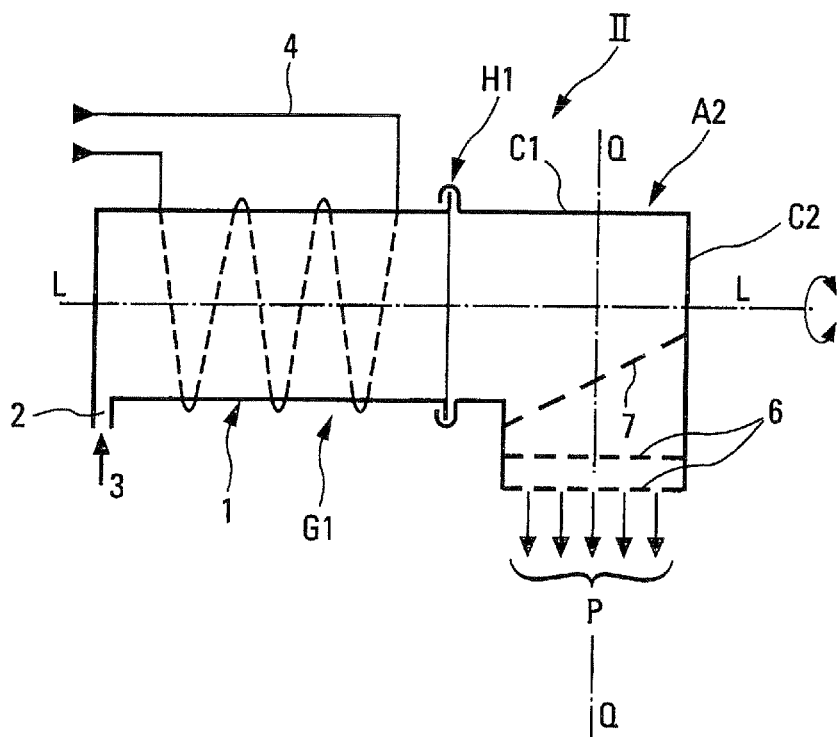

In a variation of the space electric thruster II as illustrated on FIG. 2, the above described generation part G1 (adapted to be made integral with a spacecraft) and rotation joint H1 are again present. However, the rectilinear acceleration part A1 is replaced thereon by an acceleration part A2, having its shell with the shape of a 90° bend, comprising a branch C1, with an axis L-L, connected to the generation part G1 by the joint H1 and a branch C2, with an axis Q-Q orthogonal to said axis L-L. The plasmic jet outlet side P, opposite the rotation joint H1, is perpendicular to the axis Q-Q (thus parallel to the axis L-L) and is plugged by the acceleration grids 6. Therein, as well, one or more additional acceleration grids 7 could be provided.

With the electric thruster III, steering the spacecraft occurs by the simple rotation of the acceleration part A2 around the axis L-L. Such a rotation allows, for example, the thruster II to be used for, alternately, implementing propulsion by orienting the direction of the jet P for having it pass through the gravity centre of the spacecraft, then by rotation of the acceleration part A2, creating a moment for changing the orientation of the spacecraft.

Figure 3:
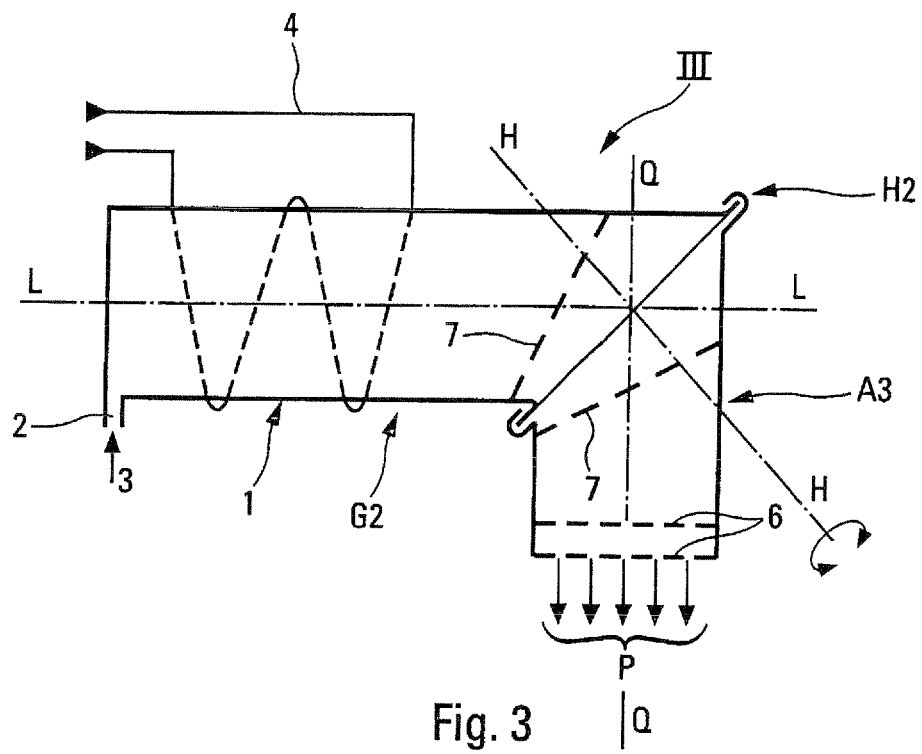

In the electric thruster III, shown on FIG. 3, the joint H2 between the fixed generation part G2 and the acceleration part A3 has an axis H-H being tilted, for example by 45°, on the axis L-L of the fixed part G2. In such a case, steering the spacecraft is thus achieved through rotating the acceleration part A3 around the tilted axis H-H.

Figure 4:
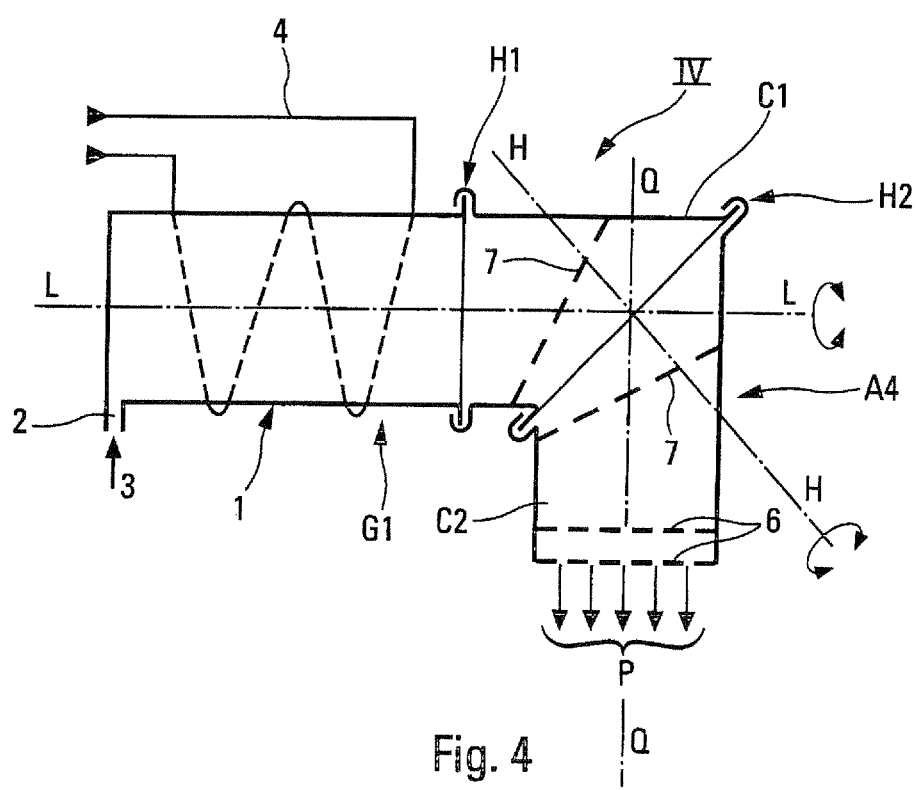

In the electric thruster IV, shown on FIG. 4, the fixed generation part G1 of FIGS. 1 and 2 is again present, as well as the joint H1, with an axis L-L. However, in such an example, the tubular acceleration part A4 is bent (like the part A2 on FIG. 2) and both branches C1 and C2 of the bend are rotationally jointed by a joint H2, with a rotation axis H-H, being tilted with respect to the axis L-L, as shown on FIG. 3. Thus, by a combination of the rotations around both axes L-L and H-H, the thrust P can be oriented in a solid angle corresponding to a full half-sphere.

The electric thruster V schematically illustrated on FIG. 5 comprises a central tubular part G3 provided with the above described jet generating means 2, 3 and 4 and two bent side tubular parts A2G and A2D provided with the acceleration means 6, 7, also hereinabove described. Each of the side tubular parts A2G and A2D is similar to the bent part A2 on FIG. 2. Said side tubular parts A2G and A2D are arranged on both sides of the central tubular part G3 and are respectively arranged rotationally with respect to the latter, thanks to rotation joints H1G and H1D, both similar to the above described joint H1.

It can be seen that thereby the thruster V emits two side thrusting jets PG and PD, being able to be oriented independently one from the other around the axis L-L of the central generation part G3.

FIG. 6 illustrates the thruster V arranged on a spacecraft SV, with the central part G3 thereof fastened on the latter and the axis L-L thereof parallel to an axis X-X of said spacecraft, being part of a system of orthogonal reference axes X-X, Y-Y and Z-Z for the latter.

FIG. 6 easily shows that while rotating the side parts A2G and A2D around the axis L-L, it is possible to communicate to the jets PG and PD a plurality of orientations being able to steer said spacecraft SV according to a plurality of translations and rotations with respect to said reference axes.

Of course, one or more other thrusters V could be arranged similarly on the spacecraft SV, for example so that the axis L-L thereof is parallel to another reference axis Y-Y and/or Z-Z.

It is to be noticed that as the pressure inside the above described thrusters is very low, the joints HT, H2, H1G, H1D could be achieved by a simple vicinity of opposite sides, ball bearings or smooth bearings providing for the relative guiding of the parts. Electric engines drive the rotation of the rotating parts. Rotating contacts or flexible wires are arranged at the level of the rotation planes, allowing the acceleration grids arranged on the rotating parts to be supplied.

Furthermore, in the case where the outgoing thrusting jet P, PG, PD is not globally electrically neutral, one or more electron injectors could be provided for neutralizing the outgoing jet.

It is to be noticed that, as opposed to what is shown on the figures, plasma heating could be achieved by a Helicon antenna arranged in the fixed part G1 à G3 of the thrusters. In such a case, guiding magnetic coils should be provided instead of the acceleration grids 6 and 7, thereby allowing the conditions for forming a double plasma acceleration layer to be created.

The invention claimed is:

1. A plasmic or ionic jet space electric thruster (I to V) for a spacecraft, comprising a tubular shell provided with a jet generator for generating said jet and with a jet accelerator for accelerating said jet, wherein:
   said plasmic or ionic jet space electric thruster comprises a tubular part (G1 to G3) provided with the jet generator and at least one tubular part (A1 to A4) provided with the jet accelerator having a jet outlet side (P);
   said tubular parts (G1 to G3 and A1 to A4) are arranged one after the other; and
   the ends opposite said tubular parts are connected to each other by a joint (H1, H2, H1G, H1D) allowing the part provided with the jet accelerator to rotate with respect to said part provided with the jet generator,
wherein the jet outlet side (P) of said tubular part (A1 to A4) provided with the jet accelerator is tilted with respect to said axis (L-L) of the rotation joint.

2. A space electric thruster according to claim 1, comprising a central tubular part (G3) provided with the jet generator and two side tubular parts (A2G, A2D) provided with the jet accelerator, said side tubular parts being located on both sides of said central part and being arranged rotationally with respect to the latter.

3. A space electric thruster according to claim 1, wherein the axis of said rotation joint (H1, H1G, H1D) between said tubular part provided with the jet generator and a tubular part provided with the jet accelerator, is merged with the axis (L-L) of said tubular part provided with the jet generator.

4. A space electric thruster according to claim 1, wherein the axis (H-H) of said rotation joint (H2) between said tubular part provided with the jet generator and a tubular part provided with the jet accelerator, is tilted with respect to the axis (L-L) of said tubular part provided with the jet generator.

5. A space electric thruster according to claim 1, wherein a tubular part (A1) provided with the jet accelerator is rectilinear.

6. A space electric thruster according to claim 1, wherein a tubular part (A2, A2G, A2D) provided with the jet accelerator has the shape of a bend.

7. A space electric thruster according to claim 6, wherein said bend forms a right angle.

8. A space electric thruster according to claim 6, wherein said bend is provided with an intermediary joint (H2) allowing one of the branches thereof (C2) to rotate with respect to the other (C1).

9. A spacecraft comprising at least one space electric thruster such as specified in claim 1 and said tubular part provided with the jet generator of said thruster is made integral with said spacecraft.

* * * * *